(12) United States Patent
Rossmann

(10) Patent No.: US 9,371,620 B2
(45) Date of Patent: Jun. 21, 2016

(54) METHOD AND DEVICE FOR BRAKING A VEHICLE WHICH HAS GONE OUT OF CONTROL

(71) Applicants: Thomas Mulert, Essen (DE); Michael Rossmann, Eurasburg (DE)

(72) Inventor: Michael Rossmann, Eurasburg (DE)

(73) Assignees: Thomas Mulert, Essen (DE); Michael Rossmann, Eurasburg (DE)

( * ) Notice: Subject to any disclaimer, the term of this patent is extended or adjusted under 35 U.S.C. 154(b) by 0 days.

(21) Appl. No.: 14/415,746

(22) PCT Filed: Aug. 5, 2013

(86) PCT No.: PCT/DE2013/000432
§ 371 (c)(1),
(2) Date: Jan. 20, 2015

(87) PCT Pub. No.: WO2014/023279
PCT Pub. Date: Feb. 13, 2014

(65) Prior Publication Data
US 2015/0211197 A1   Jul. 30, 2015

(30) Foreign Application Priority Data
Aug. 9, 2012   (DE) .......................... 10 2012 015 669

(51) Int. Cl.
*F16F 9/512* (2006.01)
*E01F 15/14* (2006.01)
*F16F 13/00* (2006.01)

(52) U.S. Cl.
CPC .............. *E01F 15/145* (2013.01); *E01F 15/146* (2013.01); *F16F 13/007* (2013.01)

(58) Field of Classification Search
CPC ....... E01F 15/145; E01F 15/146; E01F 13/08; F16F 13/007

USPC .............. 188/266.1, 278, 290; 293/102, 107, 293/108, 132, 134, 142; 256/13.1; 404/6, 404/9–11
See application file for complete search history.

(56) References Cited

U.S. PATENT DOCUMENTS 1,740,027 A * 12/1929 Romolo ................. B63B 23/18
                                                                188/290
3,674,115 A    7/1972 Young et al.
(Continued)

FOREIGN PATENT DOCUMENTS

BE   WO-98/33985 A1 *   8/1998
DE       21 47 616 A1    3/1972
(Continued)

OTHER PUBLICATIONS

GNB-CPD position paper from SGO4—EN 1317-5: 2007, "Certification of Road restraint systems—Part 5: Product requirements and evaluation of conformity for vehicle restraint systems," Issued: Feb. 22, 2012, pp. 1-13.
(Continued)

*Primary Examiner* — Pamela Rodriguez
(74) *Attorney, Agent, or Firm* — Collard & Roe, P.C.

(57) ABSTRACT

Method for braking a vehicle which has gone out of control, in which vehicle parts come into operative connection with an impact body which can be moved in the deceleration direction, wherein the impact body is connected to a controllable hydromechanical force converter and the vehicle is braked with a constantly controlled deceleration force until it reaches a standstill, wherein a measuring and control device provided in the region of the impact body controls the deceleration force of the force converter, independently of the impact mass of the respective vehicle.

14 Claims, 4 Drawing Sheets

(56) References Cited

U.S. PATENT DOCUMENTS

| | | | | |
|---|---|---|---|---|
| 3,680,662 | A | * | 8/1972 | Walker ................ E02B 3/26 104/254 |
| 3,799,064 | A | * | 3/1974 | Kikuchi ................ B61K 7/18 104/252 |
| 4,407,484 | A | | 10/1983 | Meinzer |
| 4,627,763 | A | * | 12/1986 | Roemer ................ E01F 13/08 404/11 |
| 5,797,592 | A | * | 8/1998 | Machado ............. E01F 15/146 256/13.1 |
| 7,722,284 | B1 | * | 5/2010 | Somwong ............ E01F 15/146 404/6 |
| 2005/0036832 | A1 | | 2/2005 | Smith et al. |

FOREIGN PATENT DOCUMENTS

| | | |
|---|---|---|
| DE | 100 26 621 A1 | 12/2000 |
| EP | 0 042 645 A2 | 12/1981 |
| EP | 0 674 052 A1 | 9/1995 |
| WO | 2012/074480 A1 | 6/2012 |

OTHER PUBLICATIONS

International Search Report of PCT/DE2013/000432, mailed Nov. 15, 2013.

* cited by examiner

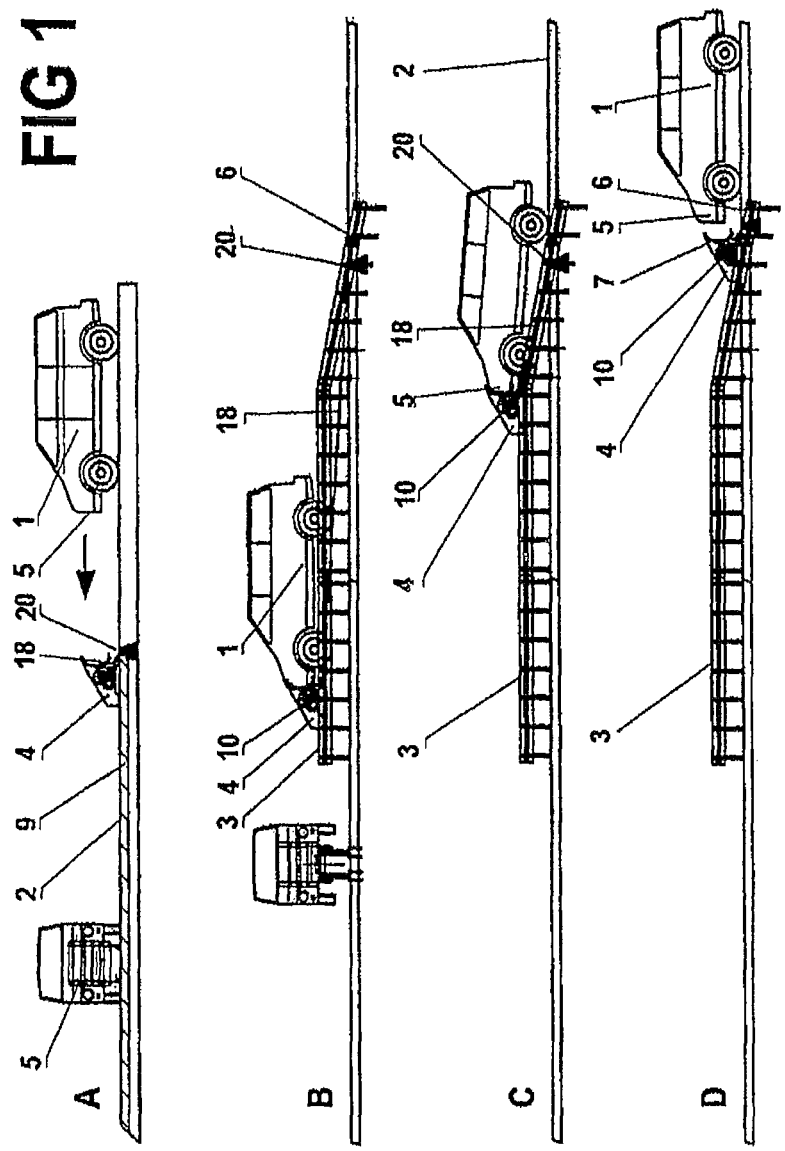

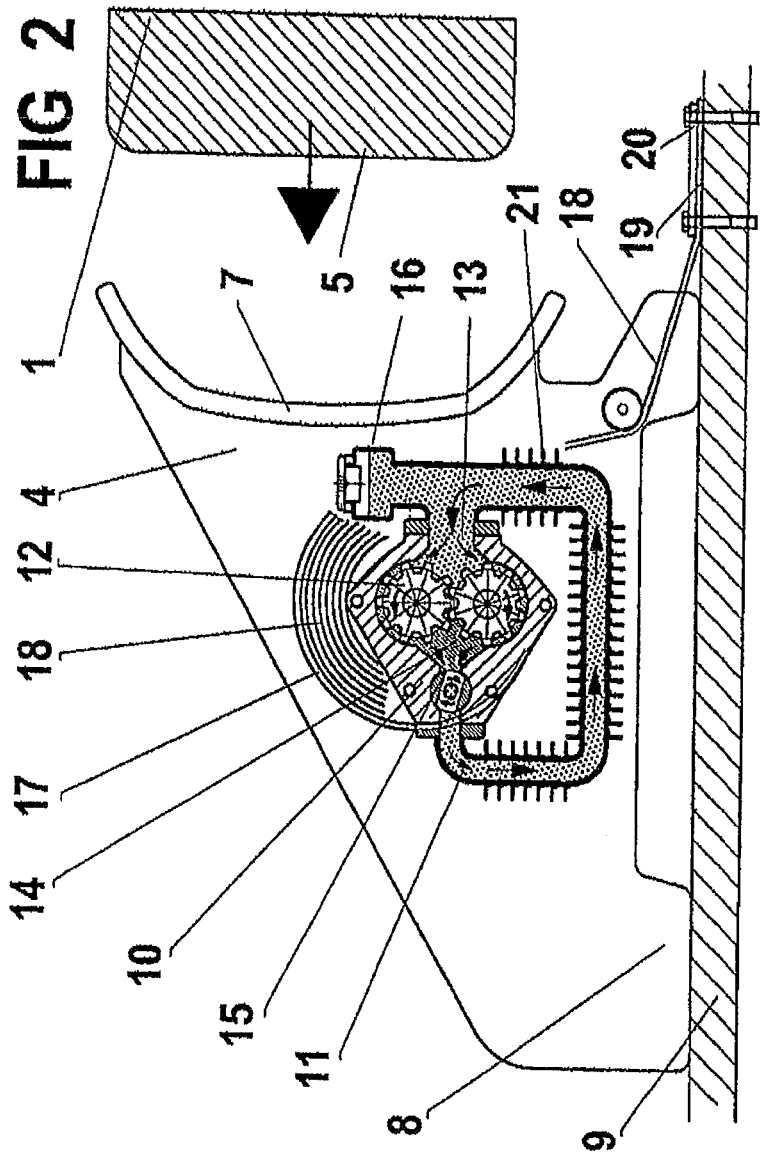

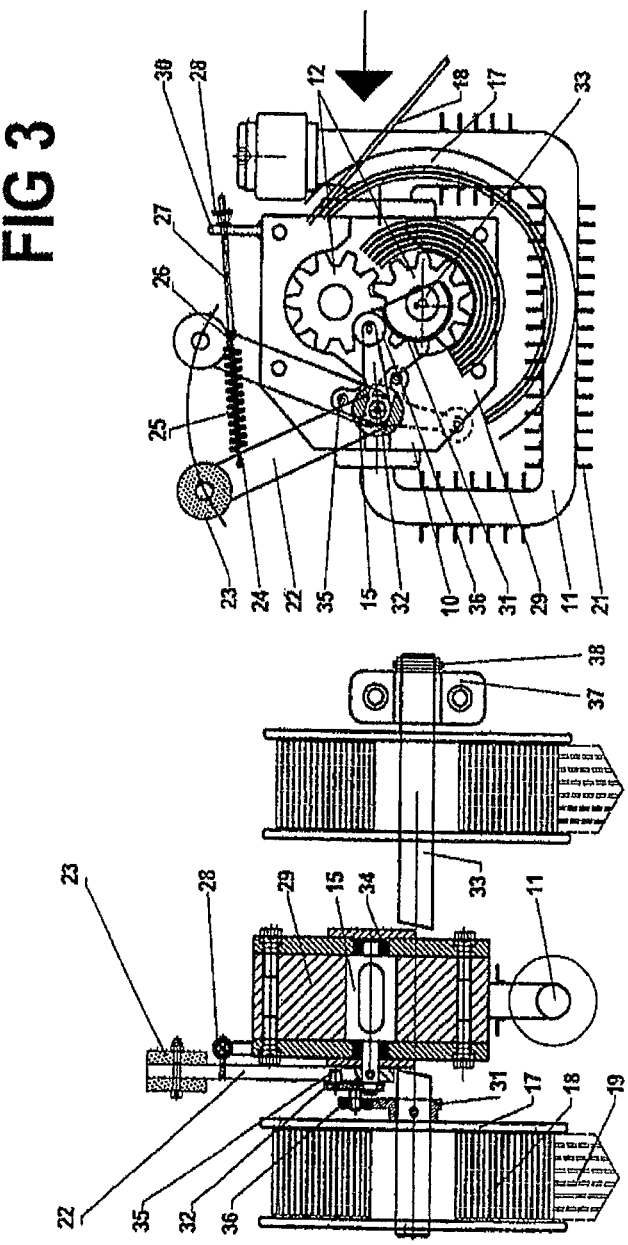

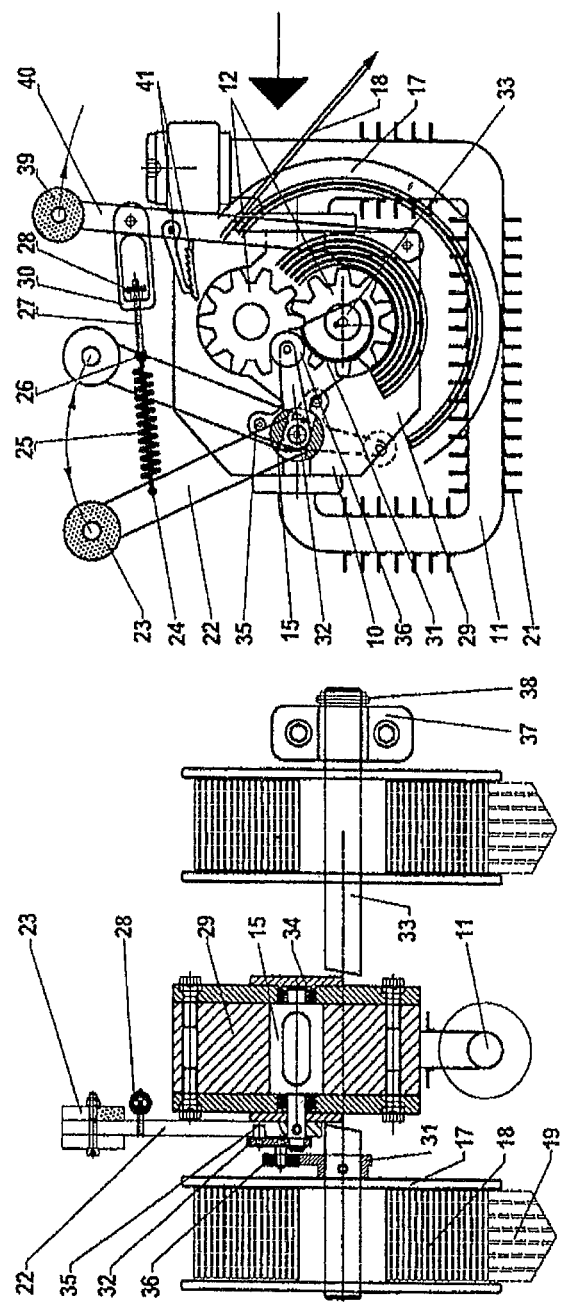

METHOD AND DEVICE FOR BRAKING A VEHICLE WHICH HAS GONE OUT OF CONTROL

CROSS REFERENCE TO RELATED APPLICATIONS

This application is the National Stage of PCT/DE2013/000432 filed on Aug. 5, 2013, which claims priority under 35 U.S.C. §119 of German Application No. 10 2012 015 669.3 filed on Aug. 9, 2012, the disclosure of which is incorporated by reference. The international application under PCT article 21(2) was not published in English.

The invention relates to a method for braking a vehicle that has gone out of control, in that vehicle parts come into operative connection with an impact body that can be moved in the deceleration direction.

One of the most frequent hazard situations on roads is an impact of vehicles that have gone out of control. In this connection, there are two different impact types, which stand in a dependence relationship with one another, but different technology is used to protect against them.

On the one hand, there is a slanted impact, whereby the guard rail, for example, is supposed to guide such vehicles back to their proper path with a braking effect.

On the other hand, there is a frontal impact, in which the impacting vehicle is supposed to be brought to a standstill with a defined and tolerable deceleration force.

In all cases, while accidents cannot be prevented, their severity can be lessened.

The most well-known retention apparatus is a guard rail next to the road.

It is standard equipment for roads and is generally buried in the ground at a slant at its end, in order to prevent a frontal impact, but this results in a new hazard situation. The impacting vehicle is catapulted upward, without being braked and without any control, and ultimately lands on the roadside or on the road. This is a situation that represents a great hazard also in the case of concrete guard rails. For this reason, these locations are often secured with an impact attenuator at their start, to prevent a frontal impact; this is a problematic method, with expensive security measures when using previous technology, because such a frontal impact attenuator provides only an unsatisfactory solution regarding the quality of a lateral, slanted impact and a frontal impact.

Such apparatuses are presented, for example, in the patent EP 0 042 645 A2.

Specifically in the case of a frontal impact, the longitudinal profiles applied for lateral impact result in mass inertia that distorts the frontal impact characteristics. A defined, constant deceleration force is impossible.

A further direct preventive measure, but predominantly against frontal impact, also exists for building protection, toll booths, bridge pilings, tunnel entrances or traffic control devices. Defined emergency stops on mountain roads must also be included among these. A special area of use exists in the case of road tunnels and their breakdown pull-over areas, but here, the core task is fire protection in the event of an impact.

In all cases, a distinction is made for these impact attenuators with regard to their affixation, as to whether they are supported on a fixed or movable barrier. The predominant number is installed in front of immovable, fixed barriers. For the sake of completeness, an example of a sliding or movable barrier will also be mentioned, for which the invention can also be used.

This is the TMA (truck-mounted attenuator), which is described in EP 0 674 052 A1. This impact attenuator is installed on the rear of a truck, for example, or also integrated into a trailer; in both cases, the securing measures are provided in moving traffic, for example a mobile work site. If an impact with the site occurs, the securing truck, whether it is standing or itself rolling, is additionally moved in the direction of travel (roll-ahead effect) during the rear-end impact and the deformation of the impact attenuator, thereby making it possible for the braking path of the vehicle that has gone out of control to be additionally lengthened, in advantageous manner.

A general problem is that the pressure force direction of a frontal impact is rarely aligned with the end base. It therefore generally also produces a lateral force, with lateral ejection of the vehicle.

Such retention apparatuses are known under the designation of vehicle impact attenuators or crash absorbers, and are certified, for example, under EN 1317 1 . . . 5 or (US) NCHRP 350. The maximally predetermined deceleration force is limited to −10 g, for example, by lawmakers. To the extent that it is possible, the vehicle that has gone out of control is supposed to be held back out of the traffic space, in order to prevent secondary hazards for road users not involved in the accident.

For all retention apparatuses, independent of their retention qualities, resistance with regard to environmental influences, such as dirt, corrosion (salt spreading materials), ice, and snow also applies. These apparatuses must be capable of use, without maintenance, for many years, and at any time, such as, for example, a guard rail.

Up to the present, no frontal impact attenuators that can automatically adapt their rigidity and thereby can adapt, as a function of deceleration force, to the impacting vehicle, have been offered on the market.

Certainly the deceleration force can be reduced to below the permissible maximal value with the compromise of significantly lengthening the impact attenuator, and thereby even greater vehicle weights and speeds can be retained. However, with this, not only is the risk in the event of a lateral impact increased, but also, unfortunately, so is the price.

As an alternative, an average value is accepted, whereby existing force peaks in the deceleration curve are often compensated or smoothed out by means of the vehicle's inherent crush zone, airbag and safety belt.

Most known systems conduct the impact force away to the end base by way of a plurality of deformation elements. Because these are disposed one behind the other, the compression force puts all of them under pressure simultaneously, from the first moment of impact, and compresses them discontinuously and in disorderly manner, to form a residual package. One must imagine that the braking procedure from 100 to 0 km/h takes place, at a deceleration of −10 g, in less than 0.5 seconds. Before the start of this procedure, there is no knowledge of the actual vehicle mass, its speed, and its impact direction. Therefore a lighter vehicle will not be able to deform the entire length of the impact attenuator, thereby increasing the deceleration force. A heavier vehicle, which the deformation bodies are not able to withstand, will be braked more weakly, and ultimately it will crash into the base, whereby a deceleration force of more than −20 g is not a rarity. This fundamental problem has not been solved in these compression systems using deformation bodies, and is becoming greater because of the tendency of increasingly lighter vehicles.

A further disadvantage in this compression arrangement is that the compression force is only randomly aligned with the end base, if at all. In most cases, it runs off-center or at a slant next to the center, thereby necessarily causing a lateral force that bends outward, if there is no stable ground guide. In practice, it is rare that the impact will take place centered or straight at an impact attenuator, because every driver in an accident will still try to avoid the unknown barrier, at the last moment. "Titanic effect."

DE 21 47 616 discloses a further impact attenuator. What is proposed is a shock absorber apparatus for protecting a locally fixed construction, having multiple compressible energy-converting elements disposed in front of it. Each of these elements delimits a cavity filled with a fluid. A component that has throttle openings is disposed above this cavity, so that the fluid can escape from the cavity by way of the throttle openings only with a speed corresponding to the impact force acting on the element.

In order to make the relationships of the forces clear, one should also consider the three diagrams that stand in dependence on one another:

1. Velocity–time (v–t); decreasing straight line toward zero (velocity-dependent)
2. Path–time (s–t); bent exponential curve (deceleration-force-dependent)
3. Force–time ($F_v$–t); horizontal straight line parallel to the X axis (dependent on vehicle mass)

If one analyzes these diagrams, one notes that diagrams 1 and 2 are irregular at the same impact velocity and a predetermined braking path, but unknown, different impact masses. The $3^{rd}$ diagram, which determines everything ($F_v$–t) line, however, should represent a horizontal straight line until just before the end in each case. Depending on the impact mass, this should be a constant parallel line that is displaced further upward or downward depending on the impact mass. This requirement is impossible in the case of conventional deformation bodies, because the deceleration force $F_v$ at −10 g is about ten times the impact mass. A car weighing 800 kg requires an $F_v$ of −8 kN as compared with a medium-size car weighing 1500 kg requiring −15 kN, which already represents a doubling of the deceleration force in the case of these two vehicle classes. Therefore a measurement sensor with a regulation device for the deceleration force directly at the pressure point is required.

Almost all the aforementioned retention apparatuses have only a restricted safety range for this reason, because they are only designed for the mass of an average vehicle, of 1.3 t, for example.

According to EN 1317.4 or NCHRP 350, the required maximal deceleration force of −10 g must be adhered to during braking, but for practical purposes, this is only possible as an average value. Both heavier and lighter vehicles are at a disadvantage.

Independent of this set of problems, the vehicle's inherent front crush zone provides significant starting assistance in all cases, with the mass of the compression section or contact plate of the impact attenuator, which is not moved at first, being accelerated.

Aside from these purely safety-relevant properties, the restoration or loss amount plays a not insignificant role. After a crash, in the case of conventional systems, the vehicle and the impact attenuator are generally ready to be scrapped. Even if insurance covers this loss, the loss to the economy as a whole should not be ignored.

The invention is based on the task of making available a method for braking a vehicle that has gone out of control, with which method the disadvantages of non-regulatable deformation bodies can be overcome, whereby the impact mass of the respective vehicle is not supposed to have any influence on its braking behavior.

Furthermore, it is a task of the object of the invention to propose an apparatus that is simple in structure and can be used again, even after a crash.

This task is accomplished by means of a method for braking a vehicle that has gone out of control, in that vehicle parts come into operative connection with an impact body that can be moved in the deceleration direction, wherein the impact body is connected with a regulatable hydro-mechanical force converter, and the vehicle is braked to a standstill with a constantly regulated deceleration force, wherein a measurement and regulation device provided in the region of the impact body regulates the deceleration force of the force converter, independent of the impact mass of the respective vehicle.

Advantageous further developments of the method according to the invention can be derived from the related method-specific dependent claims.

This task is also accomplished by means of an apparatus for braking a vehicle that has gone out of control, comprising an impact body that can be moved in the deceleration direction, a hydro-mechanical force converter that stands in operative connection with the body, as well as a measurement and regulation device, wherein the hydraulic part of the force converter has at east one hydraulic circuit, comprising at least one gear-wheel pump, and the mechanical part of the force converter is formed by at least one wound-up tension element provided on the impact body side, the free winding end of which is firmly anchored outside of the impact body, in such a manner that in the event of a movement of the impact body, the tension element can be unwound, and the gear-wheel pump generates a regulatable fluid circuit in the hydraulic part of the force converter, and the fluid circuit is heated in the course of the braking procedure of the vehicle.

Advantageous further developments of the apparatus according to the invention can be derived from the related object-specific dependent claims.

According to the invention, a mechanical-hydraulic method for braking of vehicles that have gone out of control is therefore proposed, which method comprises a measurement and regulation device in the region of the impact body and thereby regulates the deceleration force of the force converter, independent of the impact mass of the respective vehicle.

In order to accomplish this, a hydraulic force converter is supposed to be used. This converter generates a continuous fluid circuit, using its gear-wheel pump. For this purpose, the rotational movement takes place by means of unwinding a tension element configured as a tension belt that has been wound onto a drum, which element is anchored on a fixed base (ground) at its free end.

Because, in the case of this fluid circuit, pressures of up to 1000 bar can occur on the pressure side of the gear-wheel pump, depending on the impact mass, it is advantageous to dispose the throttle valve in the same pump block as the gear wheels, directly behind these, thereby making it possible to restrict the high-pressure region to a small region in front of the throttle valve. The fluid situated behind the throttle valve, in the return line, at low pressure, is cooled by means of cooling bodies. Leakages are not expected in this connection.

If the impact depression of the impact body is accelerated by the crash vehicle, the fluid circuit is put into operation. During a starting phase with a path of about 20 cm, the throttle body must at first be held open, in forced manner, by a release cam and a setting lever, so that the force converter and the regulation mass, with its setting lever, can synchronize to the impact velocity. From this moment of release of the regulation mass, the mass can close the throttle bodies by way of the regulation spring and the setting lever. The deceleration force goes into effect, with the regulation mass/reset spring system starting the braking procedure. As a result, the regulation spring is tensed and closes the regulation throttle, thereby causing the pressure to increase and with it the deceleration force that acts on the regulation mass, and the mass becomes active and opens the throttle body counter to the regulation force, and lowers the pressure. Because the flow volume continuously decreases during deceleration, until the final standstill, constant closing of the throttle body is the result. This procedure can advantageously be smoothed out by means of a directive force locking mechanism.

Although a constant pressure must be maintained here, a pre-controlled pressure regulator would be unusable, because the respective impact mass, which also relates to the system pressure, is unknown before every crash.

It is advantageous that a tension belt composed of a carbon-fiber-reinforced strip is proposed as a tension element, because its breaking load is great at a low inherent weight. Likewise, two or more tension belts disposed in parallel, on separate winding drums, in each instance, but on the same force converter block, can be advantageous. In this arrangement, an off-center pressure on an impact depression of the impact body, for example having the width of a vehicle, generates parallel movement on both sides of the impact depression. The deceleration force generated by the force converter block remains the same, in this connection. Also, the tendency of the vehicle to break out toward the side is reduced. It is also advantageous if the regulation spring is structured to be adjustable, for example by means of a knurled nut. In this way, one can increase or reduce the desired deceleration force to the impact depression, as desired, with the possibility of changing the −g value in accordance with the site of use, without making any changes to the apparatus. If a lower value of −6 g, for example, is chosen, the stress on the impact attenuator will be significantly less; this makes it possible to brake even heavier vehicles, such as small trucks. For this case, of course, lengthening of the tension belt is also required.

In many cases, such devices are adjusted, however, to the maximal deceleration force of −10 g, for example, which has been approved by lawmakers, and thereby only fast-traveling cars are given preference over trucks.

In order to be able to meet the requirements of both problems (truck/car), it is proposed to use a second regulator, called the pre-regulator, which changes the bias of the regulation spring force accordingly. For this purpose, the base (support element) is no longer attached to the force converter block but rather to a newly introduced setting lever. By means of its inert mass body, the setting lever moves counter to the impact effect at the beginning of the impact effect, and in this connection increases the tension of the regulation spring by way of the support element. The pre-regulator can furthermore be equipped with a fall-back lock, which fixes the maximal stop of the regulator in place at the moment of acceleration equalization.

A further advantageous embodiment is to equip the simple release cam with a program disk having a step-down gear wheel mechanism. In this way, for example, an end phase, among other things, can also be controlled, in addition to the start phase, in the form of a reduction in the deceleration force, thereby preventing what is called reverse acceleration acting on the vehicle passengers, who are subject to a full deceleration load. Deceleration force diagrams in which a special start and end phase are desired are more convenient, but have not yet been required by lawmakers.

As soon as the impact attenuator comes into the rest position, as is the case at the end or the beginning of the deceleration procedure, the regulation spring sets the regulation mass to its end stop, counter to the movement direction, and thereby throttles the fluid circuit toward 0, which brings about a blockade of the gear-wheel pump. In order to prevent this at the beginning, during the start phase, a compulsory open position is required. For this purpose, the setting lever is released in defined manner, by means of the tilt lever and the cam.

Although the principle of the invention has thereby essentially been described, further advantageous characteristics should be mentioned for the apparatus.

In terms of design, this remains a challenge, in view of the accompanying circumstances that exist, such as, for example, the very short braking time of less than 0.5 seconds or a possible hydraulic peak pressure force of up to 1000 bar, not to mention the required reliability under the most disadvantageous environmental conditions. Such safety devices on roads are exposed to all kinds of weather influences and environmental influences, and must withstand them for many years. Whether dirt, snow, or winter road clearance, they must be ready for use at all times, without maintenance or any electrical connection. In this connection, vandalism and hit-and-runs, in the case of a slight crash, are also not rare.

Re-usability after a crash is also particularly advantageous, not insignificantly reducing the costs of the apparatus, considered over its useful lifetime. This relates not just to the initial investment but also to a possible repair, which is almost excluded in the case of conventional impact attenuators, because everything is destroyed. In most cases, the guides are also affected, so that the entire apparatus has to be replaced. The costs arising in this connection are disproportionately high, and if one considers that in most cases, a construction crew must block the roadway for a day, in most cases, and is itself at risk in ongoing traffic, a short repair duration, if any, is a significant advantage. In the proposed system, the expensive modules such as the force converter are hardly damaged at all, and therefore can be re-used.

The known significant disadvantage of the poor degree of effectiveness in the case of such hydraulic systems becomes an advantage with this arrangement, because the primary goal is conversion of the movement energy to heat. All losses in mechanics are advantageous, in this connection. Even possible leaks, for example in the gear-wheel pump and the throttle valve, which can be kept low only with the greatest precision, are welcome here. The throttle valve represents a flow brake, for which reason the predominant part of the braking energy is released at the valve, in the form of heat, and heats the hydraulic fluid. Likewise, the gear-wheel pump is a heat source, which the pump has because of its eddies, leaks, and power loss. As a result, the entire force converter block is heated. It is advantageous if cooling ribs are provided, particularly on the return flow channel.

The tilt lever is at first pressed by the cam controller so that it is forced maximally open. After approximately 180°, it is released by turning the cam controller, and hangs downward as the result of its inherent weight, therefore the setting lever is no longer touched until the end of the braking procedure.

To ensure that the start position of the cam controller is set in "sharp" manner, so to speak, and not displaced due to inattention during handling or other manipulations or snow removal, a shear bolt is inserted. This bolt blocks the gear-wheel shaft on the outside bearing, for example. This shear bolt could also be installed at a different location.

Alternatively, the possibility also exists of using a different type of securing element in place of a shear bolt, which element, just like the shear bolt, can also be positioned at a different location of the gear-wheel shaft.

Because the degree of effectiveness of the force converter is not important—on the contrary, the goal is to convert energy into heat—no particular precision is required, neither for the two gear wheels of the gear-wheel pump nor for the rotatable regulation motion link. In addition, the period of operation in the event of a crash lies under one second, and statistically occurs only once every 10 years. This circumstance makes the production costs of the force converter block significantly cheaper.

The hydraulic fluid must be not only corrosion-inhibiting but also temperature-stable, with regard to its viscosity. It can be a brake fluid, on the one hand, and a hydraulic fluid, on the other hand, as in the case of power steering pumps.

The object of the invention is shown in the drawing, using an exemplary embodiment, and will be described as follows. The drawing shows:

FIG. 1 representation of different accident variants of a vehicle;

FIG. 2 fundamental diagram of the apparatus according to the invention;

FIG. 3 partial representation of the mechanical-hydraulic force converter in various views;

FIG. 4 alternative partial representation of the mechanical-hydraulic force converter in various views.

FIG. 1 shows different possibilities as to how a vehicle 1 that has gone out of control can be braked, in controlled manner, in the region of level roadways 2 or guard rails 3 (A-D). The impact body 4, merely indicated here, is provided at different locations of the roadway 2 or the guard rail 3 with regard to the vehicle 1. In the case of a level roadway 2 (A), this can be a highway off-ramp, for example. If the driver of the vehicle 1 has miscalculated his/her speed and is no longer able to manage the off-ramp, which is configured as a curve, the front region 5 of the vehicle 1 is brought into an operative connection with the impact body 4, frontally or laterally. The design structure of the impact body 4 is presented in greater detail in the subsequent figures. The impact body 4 is configured so that it can move in the deceleration direction (arrow). Depending on the positioning, a rail (not shown) or a different form of guide can be used here, for example. The reference symbol 6 is supposed to represent a guard rail end as an example.

FIG. 2 shows the impact body 4, only indicated in FIG. 1, as a fundamental diagram. The region of the impact body 4 that faces the vehicle 1 is configured in the manner of a depression 7, by means of which the vehicle parts 5 that come into an operative connection with it can be guided. In this example, the impact body 4 is configured in wedge shape and is also supposed to be provided with two guide saddles 8, in this example, which can be moved on guide rails 9 or the like, for example. In the region of the impact body 4, there is a mechanical-hydraulic force converter 10. The hydraulic part of the force converter 10 is formed by a fluid circuit 11, within which a gear-wheel pump formed by gear wheels 12 is installed. In this connection, the hydraulic oil is conveyed in the direction of the arrow, whereby a low-pressure chamber 13 is formed in front of the gear wheels 12, and a high-pressure chamber 14 is formed behind the gear wheels 12, in the flow direction. In the region of the high-pressure chamber 14, there is a throttle body 15 configured as a throttle valve, the function of which will be explained in greater detail in FIG. 3. In this connection, a fluid container 16, which includes the function of an equalization container, is part of the fluid circuit 11.

The mechanical part of the force converter 10 includes a winding drum 17, on which a tension belt 18 is wound up. The free winding end 19 of the tension belt 18 is attached outside of the impact body 4, on the ground side, in the region of a fixed base 20. The movement energy that occurs as the result of braking of the vehicle 1 heats the hydraulic fluid, which will be explained in greater detail below.

The movement energy of the vehicle 1 is transferred to the impact body 4 by means of contact with the depression-shaped region 7, whereby the tension belt 18 wound onto the winding drum 17 is unwound by means of the movement of the impact body 4 in the direction of the arrow. With the resulting rotation of the winding drum 17, the gear-wheel pump formed by the gear wheels 12 generates a continuous fluid circuit in the hydraulic part of the force converter 10, which circuit is braked by way of the throttle valve 15, which is dynamically controlled in this example, and thereby a constant deceleration force acts on the depression 7 or the impact body 4, respectively, which force heats the fluid circuit.

For better management of the temperatures that occur in the fluid circuit 11, cooling bodies 21 are affixed to the outer parts of the fluid circuit 11.

FIG. 3 shows the mechanical-hydraulic force converter 10 as a partial view. The right part of FIG. 3 represents a detail view from the side, while the left part of FIG. 3 discloses a detail view in the impact direction. In this connection, components that are the same are provided with the same reference symbols. In this FIG. 3, the regulation system (main regulator) is now also shown, consisting of a mass body 23 attached to a setting lever 22, which body is oriented in the braking direction and generates an equilibrium position with an adjustable spring counter-force, thereby causing the throttle valve 15 situated in the force converter 10 to close and open accordingly.

The free end 24 of a regulation spring 25 is attached to the mass-side end of the setting lever 22. The other end 26 of the regulation spring 25 interacts with a knurled nut 28 by way of a setting thread 27. The setting thread 27 is guided on the force converter block 29, on a support element 30 provided there. The throttle valve 15 is forced open for the starting phase in the event of an impact, for load-free advance running of the gear-wheel pump formed by the gear wheels 12, with a rotation of approximately 180°, which takes place from the direction of the gear-wheel shaft 33, by means of a cam controller 31 plus tilt lever 32.

The fluid circuit 11 can be seen, as can the cooling bodies 21 affixed to the outside of the circuit. The winding drum 17 and tension belt 18 are merely indicated.

The mass force regulator detects the deceleration force in effect during the entire braking time of the vehicle 1, at the depression 7 or the impact body 4, respectively, by means of its regulation mass 23, consisting, for example, of a compact metal body having a weight of at least 100 g, and can regulate the throttle valve 15 by means of the setting lever 22 on the valve, by means of rotating it by up to 70° from its open position all the way to the closed position, whereby the regulation spring 25 puts the pre-set desired deceleration force of −10 g, for example, into an equilibrium position of the regulation mass 23 that is subject to the deceleration force and the mass-neutral counter-tension spring force. The components, gear wheels 12 (gear-wheel pump) with fluid circuit line 11, winding drum 17, throttle valve 15 with regulation mass 23 and regulation spring 25 advantageously form the module, force converter block 29, which is attached in the region of the impact body 4 and thereby transfers the deceleration force directly to the regulation system, on the one hand, and, on the other hand, can pass the tension force dissipation on to the fixed base 20 by way of the tension belt 18.

The throttle valve 15 is kept open during the start phase, i.e. the beginning of compression, in the event of a vehicle impact, during a compression path of at least 180° of the first rotation of the winding drum 17, by means of the tilt lever 32 provided with a follower roll 36, and is only released from this locked position after acceleration synchronization by means of the cam disk 31, by the gear-wheel pump shaft 33. On the throttle body side, a driver tooth 35 is provided on the setting lever 22 for this purpose. The bias of the regulation spring 25 is equipped with an adjustment possibility, for example a setting thread 27 and a knurled nut 28. The regulation mass 23 is guided in roller bearings 34 in the region of its free lever end, on the throttle valve side.

The tilt lever 32 is forced maximally open, at first, in the start position, by means of the cam disk 31. It is released after approximately 180° by means of rotation of the cam disk 31, and then hangs downward as the result of its inherent weight, so that the setting lever 22 is no longer touched until the end of the braking procedure. This position is shown with a broken line.

To guarantee that the start position of the cam disk 31 is not displaced due to shocks or similar inattention during handling or other manipulations, a shear bolt 38 is used. Other securing elements are also possible, of course. The shear bolt 38 blocks the gear-wheel shaft 33 in the outside bearing 37, for example. The shear bolt 38 or a different type of securing element could also be provided at a different location.

It is not shown in any detail here, but it is technically practical and possible to provide the force converter block 29 with a dust-protected and water-spray-protected housing.

FIG. 4 shows an alternative to FIG. 3. While a fixed maximal deceleration force, e.g. −10 g, can be set at the regulation spring 25 in FIG. 3, in FIG. 4 a pre-regulation device is used. The components addressed in FIG. 3, including the main regulator, are also present in FIG. 4. In addition, there is a further setting lever 40, which is provided with a mass body 39 in the region of its free end. The regulation spring 25 is not fixed in place in this example, but instead is articulated onto the setting lever 40 by way of a support element 30 that acts as a tension element. The components 30, 39, 40 form what is called a pre-regulator, while the device described in FIG. 3 only contains a main regulator.

As compared with FIG. 3, the device shown in FIG. 4 is able to react flexibly to different vehicle types (truck/car) and differently great impact speeds of the respective vehicle. Because of what is called the pre-regulator, the deceleration force can be regulated downward automatically, even in the case of a slow, heavy impact.

If the deceleration force is set in fixed manner, the braking path is used only in part—as can be derived from the following table:

| A | ~4.1 m | at 100 km/h impact velocity |
| B | ~2.5 m | at 80 km/h impact velocity |
| C | ~1.7 m | at 60 km/h impact velocity |

In contrast, when using a pre-regulator, full utilization of the braking path is possible, in that a ~g value dependent on velocity can be implemented.

A ~4.1 m at 100 km/h impact velocity
(−10 g deceleration force)
B ~4.1 m at 80 km/h impact velocity
(−6.3 g deceleration force)
C ~4.1 m at 60 km/h impact velocity
(−3.5 g deceleration force)

This example makes it clear that the body stress in the second example is significantly lower. This holds true in the same manner also for the forces acting on the device as a whole. It is true that the expansion of FIG. 4 as compared with the embodiment in FIG. 3 is more cost-intensive, but it is able to react more flexibly to different impact velocities and vehicle weights.

The different method of functioning as compared with FIG. 3 will be described below:

The change in the deceleration force takes place by means of the additional pre-regulator 39, 40, which changes the bias of the force of the regulation spring 25 accordingly. For this purpose, the support element 30 indicated in FIG. 3 is no longer attached to the force converter block 29, but instead to the further setting lever 40. By means of its inert mass body 39, the setting lever 40 moves counter to the impact effect at the beginning of the impact effect, and thereby increases the tension of the regulation spring 25 by way of the support element, which is configured as a tension element here. The pre-regulator is furthermore equipped with a fall-back lock 41, which fixes the maximal stop of the setting lever 40 in place at the moment of acceleration equalization.

If the tension spring 25 is given greater tension, it thereby reduces the throttle through-flow, and the deceleration force (−g value) increases. The greater this start acceleration on the pre-regulator, the greater the deceleration force becomes. The deceleration force is set to a lowered deceleration force, e.g. −3 g, by means of the knurled nut 28. Depending on the impact velocity, the regulation mass 39 acts on and increases the tension of the regulation spring by way of the setting lever 40. The regulation range of the braking force is thereby increased accordingly.

REFERENCE SYMBOL LIST 1 vehicle
2 level road
3 guard rail
4 impact body
5 frontal region
6 guard rail end
7 depression
8 guide saddle
9 guide rail
10 force converter
11 fluid circuit
12 gear wheel (pump)
13 low-pressure chamber
14 high-pressure chamber
15 throttle body (throttle valve)
16 fluid container
17 winding drum
18 tension belt
19 free winding end
20 fixed base (on ground side)
21 cooling body
22 setting lever (main regulator)
23 mass body (main regulator)
24 free end of setting lever
25 regulation spring
26 free end of regulation spring 27 setting thread
28 knurled nut
29 force converter block
30 support element/tension element
31 cam controller
32 tilt lever
33 gear wheel shaft
34 roller bearing
35 driver tooth
36 follower roll
37 outside bearing
38 shear bolt
39 mass body—pre-regulator
40 setting lever—pre-regulator
41 fall-back lock

The invention claimed is:

1. Method for braking a vehicle that has gone out of control, in that vehicle parts come into operative connection with an impact body that can be moved in the deceleration direction, wherein the impact body is connected with a regulatable hydro-mechanical force converter, and the vehicle is braked to a standstill with a constantly regulated deceleration force, wherein a measurement and regulation device provided in the region of the impact body regulates the deceleration force of the force converter, independent of the impact mass of the respective vehicle, wherein the hydraulic part of the force converter has at least one fluid circuit, comprising at least one gear-wheel pump, and the mechanical part of the force converter is formed by at least one wound-up tension element provided on the impact body side, a free winding end of which element is firmly anchored outside of the impact body, in such a manner that in the event of a movement of the impact body, the tension element can be unwound, and the gear-wheel pump generates a regulatable fluid circuit in the hydraulic part of the force converter, and the fluid circuit is heated in the course of the braking procedure of the vehicle.

2. Apparatus for braking a vehicle that has gone out of control, comprising an impact body that can be moved in the deceleration direction, a hydro-mechanical force converter that stands in operative connection with the body, as well as a measurement and regulation device, wherein the hydraulic part of the force converter) has at least one fluid circuit, comprising at least one gear-wheel pump, and the mechanical part of the force converter is formed by at least one wound-up tension element provided on the impact body side, a free winding end of which element is firmly anchored outside of the impact body, in such a manner that in the event of a movement of the impact body, the tension element can be unwound, and the gear-wheel pump generates a regulatable fluid circuit in the hydraulic part of the force converter, and the fluid circuit is heated in the course of the braking procedure of the vehicle.

3. Apparatus according to claim 2, wherein at least one throttle body is contained in the fluid circuit that contains a hydraulic fluid.

4. Apparatus according to claim 3, wherein the throttle body stands in an operative connection with a deceleration force regulator that comprises a mass body, which regulator can be moved relative to the impact body, in such a manner that a regulation spring brings about a constant deceleration force of the mass body.

5. Apparatus according to claim 4, wherein the mass body is disposed at the free end of a lever that stands in an operative connection with the throttle body, the relative movement of which lever, with regard to the impact body, runs in a motion link, wherein one end of the regulation spring is attached to the lever on a mass body side, while the other end of the regulation spring is mounted in the region of a supporting element attached to a force converter block, by way of setting elements.

6. Apparatus according to claim 5, wherein the setting elements have a setting element for adaptation of the deceleration force of the mass body, on a support element side.

7. Apparatus according to claim 4, wherein the mass body is disposed at the free end of a lever that stands in an operative connection with the throttle body, forming a main regulator, the relative movement of which runs in a motion link, with regard to the impact body, wherein a further setting lever plus mass body are provided, forming a pre-regulator, and wherein one end of the regulation spring is attached to the lever, on a mass body side, while the other end of the regulation spring is mounted in the region of a tension element attached to a setting lever, by way of setting elements.

8. Apparatus according to claim 7, wherein the pre-regulator stands in an operative connection with a fall-back lock.

9. Apparatus according to claim 2, wherein the impact body is configured in the manner of a guide carriage that is guided as necessary, having a region that faces the vehicle and is configured approximately in the manner of a depression.

10. Apparatus according to claim 2, wherein the tension element that forms the mechanical part of the force converter is configured as a tension belt.

11. Apparatus according to claim 2, wherein the tension element comprises a carbon-fiber-reinforced woven fabric or metal.

12. Apparatus according to claim 2, wherein the force converter is encapsulated with a dust-protected and water-spray-protected housing.

13. Apparatus according to claim 2, wherein a shear bolt is used as a securing element, by means of which bolt displacement of a cam disk, configured as a cam controller, with regard to its start position is prevented.

14. Apparatus according to claim 13, wherein the shear bolt is provided in the region of an outside bearing of a gear-wheel shaft.

* * * * *